E0152 XR 3,328,510

COMBINATION TELEPHONE AND CO-AXIAL CONDUIT MEANS

Filed March 22, 1965

INVENTOR
RAYMOND E. WHITE
BY Toulmin & Toulmin
ATTORNEYS

United States Patent Office 3,328,510

Patented June 27, 1967

3,328,510

COMBINATION TELEPHONE AND CO-AXIAL CONDUIT MEANS

Raymond E. White, Chillicothe, Ohio, assignor to Chillicothe Telephone Company, Chillicothe, Ohio, a corporation of Ohio Filed Mar. 22, 1965, Ser. No. 441,500
9 Claims. (Cl. 174—41)

This invention relates to a method and apparatus for distributing high frequency currents (such as used in closed circuit Community Antenna Television Service) and telephone service to the ultimate customer.

More particularly, the apparatus relates to the unitized conduit means used in supplying the above services.

During recent years several telephone companies are expanding their communication facilities to include such high frequency current service as Community Antenna Television Service, hereinafter called (CATV) in addition to typical telephone service already provided.

The specific provision of CATV service came about due to the requests of television viewers who are demanding a greater variety of programs and better reception. The same conduit referred to above, can, however, be used to provide a variety of other high frequency services such as FM audio signals, etc.

Some of the means employed in providing the improved television viewing and FM listening comprise specially erected antenna towers to bring in distant signals which are then distributed over closed circuit co-axial cables which are routed over poles and/or underground to those subscribers having suitable receiving equipment.

Only recently have some telephone companies made their utility poles available for delivering high frequency current service over co-axial cable means as many telephone companies felt that their poles were not engineered for occupancy by a second party. In many instances, utility companies are already sharing their poles with other utility companies which tends to further complicate the arrangement. While there have been pioneers in the field of high frequency current service, most telephone companies have not, to date, provided such a service. There is now, however, a rapidly increasing number of companies becoming both directly and indirectly involved in this type of service.

Another of the several reasons why telephone companies have not been too receptive to providing high frequency current, hereinafter called (H.F.C.) service is that two separate "drops" were required for connection from the distribution poles to the input terminal of the ultimate subscriber or customer. This dual system of lead-in cables, i.e. one for telephone and one for H.F.C. service, caused an unsightly appearance from the customer's point of view. The dual system also was expensive to install and maintain from the telephone company's point of view.

A definite and growing need exists for a single conduit means which can be used to provide a single "drop" between the distribution terminal (which may be on a utility pole or buried underground) and the input terminal of the ultimate customer.

A single conduit means such as the above is used to provide separate paths for the normal telephone and the special H.F.C. services, and forms part of the invention of this application.

There are several modifications disclosed herein of the single conduit means. All of the modifications are enclosed in a protective insulating sheath and some of the modifications are provided with web portions joining the cables for H.F.C. such as is used in CATV and telephone service. These web portions are easily slit to provide for separation of the cables when installing them at the junction terminals.

Accordingly, a primary object of this invention is to provide a single conduit means which is especially adaptable for distributing H.F.C. such as is used in CATV and telephone services.

Another object is to provide a method of distributing H.F.C. such as is used in CATV and telephone services from a distribution terminal to a customer's terminal.

A further object of this invention is to provide a single unitized conduit means which provides separate paths for the H.F.C. such as is used in CATV and telephone services.

Another object is to provide a single conduit means such as the above which is economical to manufacture and to install and which is readily adaptable to be separated into separate leads for connection to appropriate connection terminals.

Another object is to provide a single unitized conduit means of the above type which has support means therein for supporting the conduit means over long spans.

These and other objects and advantages of this invention will be more fully described in the following specification and drawings, in which.

Figures 1, 2, 3, 4, 5, 6, 7, 8:
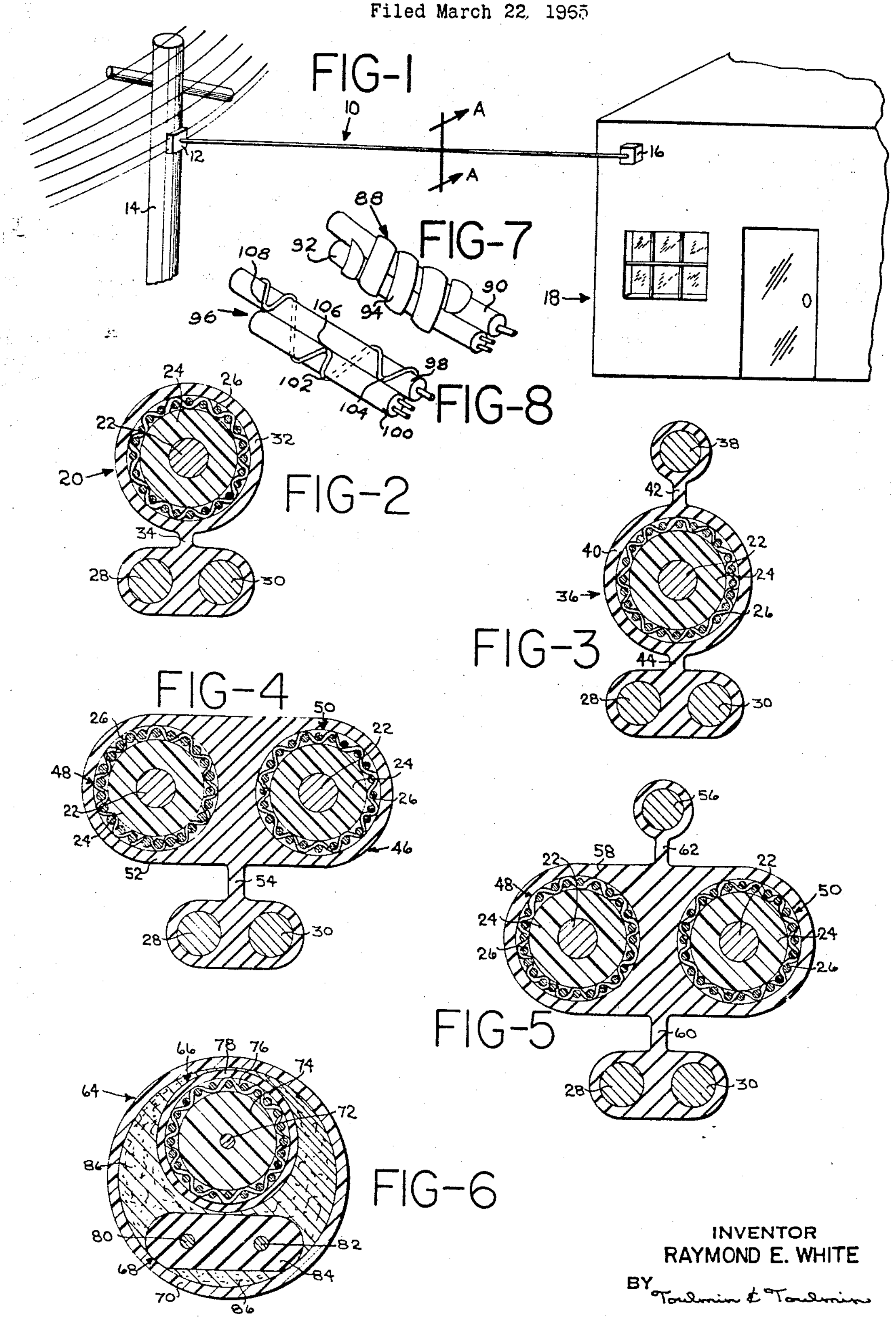
FIGURE 1 is a general perspective view showing the conduit means of this invention in a typical application between the distribution terminal on a utility pole and the customer's input terminal.
FIGURE 2 is a cross sectional view of the conduit means taken along the lines A—A of FIGURE 1.
FIGURE 3 is a cross sectional view similar to FIGURE 1 showing another embodiment of the invention which includes a supporting wire.
FIGURE 4 is a cross sectional view similar to FIGURE 1 showing another embodiment which utilizes dual co-axial cable means within the conduit means of this invention.
FIGURE 5 is a cross sectional view similar to FIGURE 4 which also includes a supporting wire.
FIGURE 6 is a cross sectional view similar to FIGURE 1 showing another embodiment of the invention.
FIGURE 7 shows a perspective view of another modification of the invention.
FIGURE 8 shows a perspective view of another modification of the unitizing member.

Referring to the drawings in more detail, FIGURE 1 is a general perspective view showing the conduit means generally designated 10 in a typical application between a distribution terminal 12 on a utility pole 14 and a customer's input terminal 16 which may be on or within a dwelling 18, school, place of business, etc. The particular connecting means (not shown) which are used to connect the conduit means 10 to the corresponding terminals may be standard terminals and do not form a part of this invention.

FIGURE 2 shows a cross sectional view of one embodiment of the conduit means of this invention. This embodiment generally designated 20 comprises a co-axial cable made up of a central conductor 22 which is surrounded by a uniform layer of dielectric insulation 24. A suitable grounding shield 26 which may be braided copper and the like, is positioned around the uniform insulating layer 24 as is known in the art. The co-axial cable provides the H.F.C. service to the customer.

The conduit means 20 also comprises a pair of electrical conductors 28 and 30 which are spaced from each other and provide the telephone service to the customer. These conductors may be single or multiple pairs, parallel or twisted as is known in the art.

Both the co-axial cable and the pair of electrical conductors are enveloped by a continuous integrally formed layer of suitable insulating material 32. This layer of insulation 32 may be simultaneously formed about the cable and telephone conductors as by extruding the layer thereon by known methods, as an example, the known plastic materials provide a good insulating layer.

It should be noted that a narrow web portion 34 connects the insulated co-axial cable and telephone conductors as shown. This is a special feature of this invention in that it provides the means by which the co-axial cable and telephone conductors may be easily separated from each other when connecting the individual conductors to the pertaining connections at the terminals 12 and 16. The web portion 34 is thin in relation to the dimensions of the co-axial cable, for example, and maintains the co-axial cable and telephone conductors or "drop wire" in a fixed relationship to each other. The telephone wires may be extruded in a horizontal plane (as shown) or extruded in a vertical plane. The web portion 34 is readily cut by a knife or special slitter, for example, to separate the co-axial cable from the telephone drop wire and thereby alter the fixed relation therebetween.

FIGURE 3 shows another embodiment of the conduit means which is generally designated 36. This conduit means has the conductor 22, layer of dielectric insulating material 24 and an appropriate shielding element 26, previously mentioned, along with telephone conductors 28 and 30.

In addition to the above, there is a supporting cable or messenger wire 38 which supports long lengths of the unitized cable. The cable 38 is secured to the pole 14 and customers dwelling unit 18 by clamp means not shown.

The supporting cable 38, the co-axial cable formed, and the telephone drop wire made up of the one or more pairs of conductors are then enveloped by a continuous layer of insulating material 40 which is simultaneously formed by extruding the layer 40 thereon by known methods.

It should be noted that supporting wire 38 is connected to the co-axial cable on one side thereof by a web portion 42 as shown. A second web portion 44 joins the other side of the co-axial cable to the telephone drop wire and the wire 38, co-axial cable and telephone drop wire are maintained in spaced fixed relation as shown. The web portions 42 and 44 are thin and easily cut to provide for ease in making connections at the terminals 12 and 16.

FIGURE 4 shows yet another embodiment in which the conduit means generally designated 46 incorporates two separate co-axial cables and one or more telephone drop wires therein which are all insulated from one another as shown. The co-axial cables generally designated 48 and 50 respectively each comprise a central conductor 22 which is surrounded by a uniform dielectric insulating layer 24. A suitable shielding conductor 26 is placed around the dielectric layer 24 as previously explained. The telephone drop wire made up of conductors 28 and 30 are also shown. A layer of suitable insulating material 52 is formed about the co-axial cables 48, 50 and the telephone conductors 28 and 30 by extruding the layer thereon by known methods. Other known methods may be employed.

By the above construction, the pair of co-axial cables 48 and 50 and the telephone conductors 28 and 30 are maintained in spaced fixed relationship as shown and are also insulated from one another. A web portion 54 similar to the other web portions previously explained joins the telephone "drop wire" to the pair of co-axial cables.

The embodiment shown in FIGURE 5 is identical to that shown in FIGURE 4 except a supporting wire 56 is added. The supporting wire 56, the co-axial cables 48 and 50 and the telephone conductors 28 and 30 all have a layer of suitable insulating material 58 extruded thereover as previously explained, and are maintained in fixed spaced relation by web portions 60 and 62 which are formed by said layer 58. These web portions are thin and readily cut as previously explained.

FIGURE 6 shows another embodiment of the invention in which the H.F.C. and telephone services are provided over a single conduit means generally designated 64. The conduit means 64 comprises a separate co-axial cable 66 and telephone drop wire 68 which are housed in a single suitable insulating layer or jacket 70.

The co-axial cable 64 is a standard co-axial cable having the usual center conductor 72, insulating material 74, metallic shield 76 and outer jacket 78.

The telephone drop wire 68 consists of a pair of conductors 80 and 82 which are imbedded in a known suitable insulating means 84. A suitable filler 86, such as jute, may be used to fill the voids to preserve the configuration shown. The jacket 70 may be extruded or wrapped over the cable 66, drop wire 68 and filler (if used) 86 by known means. A suitable support cable (not shown) may also be incorporated within the jacket 70 to provide support for the conduit means over long spans.

In all the embodiments shown, both the H.F.C. service and the telephone service conductors are delivered to the input terminal of the customer over a single unitized conduit means. Having one conduit means greatly reduces the unsightliness of multiple cables and also reduces the installation and maintenance costs.

Several of the above modifications have web portions which are readily cut to separate the H.F.C. service and telephone service conductors from each other to provide for easy installation at the points of termination.

The particular sizes of the cables and their conductors would be dependent upon the specific customer's needs and the distances over which the conduit means must be spanned. While spanning is mentioned and illustrated, it is understood that the conduit means as herein developed and the method of distribution of the H.F.C. and telephone service, also includes burying the conduit means instead of spanning it.

FIGURE 7 is a perspective view of a portion of yet another unitized conduit means generally designated 88 and which includes a co-axial cable means 90 and telephone drop wire means 92. Each of these cable means and wire means has its own suitable insulation on the exterior thereof. The cable means 90 and the drop wire means are formed into a unitized conduit means by insulating member 94 which is spirally wound around the cable means and drop wire means as shown. Member 94 may be a plastic ribbon which is spirally wound around the two elements as is known in the art.

An advantage of the above construction over that shown in FIGURE 6 is that the spaces between the spiralings of element 94 provide for drainage of water which may collect at the lowermost portion of the cable when suspended between two terminals. In FIGURE 6, such water may collect inside sheath 70. The co-axial cable means and the drop wire means in the FIGURE 7 embodiment may of course comprise one or more co-axial cables and one or more drop wires which may be of the various varieties known in the art. Suitable support wires may be included along with the co-axial cable means and drop wire means to be enveloped by member 94.

FIGURE 8 is a perspective view of another modification of the unitized conduit means generally designated 96 and which includes a standard co-axial cable 98 and telephone drop wire 100. The cable and drop wire have their own insulation on the exterior thereof and are formed into a unitized conduit means by the member 102. Member 102 is a preformed element having a plurality of bends therein as shown and is generally used on telephone cable near the handset on the customer's telephone, to keep the cable from twisting and tangling.

In the FIGURE 8 embodiment, the member 102 is made large enough to envelop the particular number of coaxial cables and telephone drop wires to be included in the unitized conduit means. The member 102 receives the cable 98 and drop wire 100 by bending them together and placing them successively under the successive reverse bends 104, 106, and 108 on element 102. The member 102 is made by techniques known in the art and may be made of metal with a insulating layer such as plastic on the exterior thereof as is known in the art. The main advantage of the FIGURE 8 modification is that of good drainage as explained in the FIGURE 7 modification.

Modifications of this invention will obviously occur to those skilled in this art and it is to be understood, therefore, that this invention is not limited to the particular embodiments disclosed but that it is intended to cover all modifications of unitizing high frequency current cable and telephone drop wire as fall within the scope of the appended claims.

What is claimed is:

1. A unitized conduit comprising a coaxial cable with a single heavily insulated central conductor for delivering high frequency currents for television service, telephone conductors along the same conduit for delivering audio frequency currents, and means for keeping the cable and the conductors in substantial parallelism and at a fixed distance from each other.

2. The conduit of claim 1, in which said means comprises a tubular insulating sheath enveloping and in closely fitted tangential contact with both the cable and the telephone conductors, the remaining free spaces in the sheath being occupied by an insulating filler.

3. A unitized conduit comprising a coaxial cable with a single heavily insulated central conductor for delivering high frequency currents for television service, telephone conductors in the same conduit for delivering audio frequency currents and a continuous generally spiralling member enveloping said cable and said telephone conductors.

4. The conduit of claim 3, in which the spiralling member has a plurality of spaced reverse bends to provide openings through which the cable and/or the conductors can be inserted or removed.

5. A method of transmitting both high frequency currents and audio frequency currents from a distribution terminal to a customer's input terminal by means of a multiple-strand cable containing in it a coaxial cable with a heavily insulated central conductor and a pair of insulated parallel conductors spaced from the coaxial cable by intermediate insulation, said method comprising separating the coaxial cable from the parallel conductors by cutting the intermediate insulation at the two terminals, suspending the coaxial cable between the two terminals and separately suspending the parallel conductors between the same two terminals while they still remain connected to the coaxial cable by the intermediate insulation, transmitting high frequency currents through the central conductor, and simultaneously transmitting audio frequency currents through the parallel conductors.

6. A unitized conduit for the simultaneous distribution of closed circuit high frequency currents and telephone service from a distributing terminal to a customer's input terminal comprising:

(a) a coaxial cable for supplying high frequency current, said cable having a central conductor surrounded by a uniform layer of dielectric insulation and a grounding shield positioned around said uniform layer;

(b) a plurality of electrical conductors for providing audio frequency currents; and (c) means for maintaining said coaxial cable and said plurality of electrical conductors in parallel spaced and proximate relationship comprising a continuous insulating layer.

7. The unitized conduit of claim 6, further comprising a support wire and said means for maintaining said coaxial cable and said plurality of electrical conductors also maintaining said support wire in parallel spaced and proximate relationship.

8. The unitized conduit of claim 7, wherein said means for maintaining further comprises a first web portion connecting said coaxial cable and said plurality of electrical conductors, and a second web portion connecting said coaxial cable and said support wire.

9. The unitized conduit of claim 6, wherein said means for maintaining further comprises a web portion connecting said coaxial cable and said plurality of electrical conductors.

References Cited

UNITED STATES PATENTS

| | | | |
|---|---|---|---|
| 278,635 | 5/1883 | Townsend | 174—41 X |
| 3,207,836 | 9/1965 | Slechta | 174—70 X |

FOREIGN PATENTS

| | | |
|---|---|---|
| 499,894 | 12/1950 | Belgium. |
| 834,015 | 5/1960 | Great Britain. |
| 424,995 | 9/1947 | Italy. |

LARAMIE E. ASKIN, *Primary Examiner.*

J. RUGGIERO, *Assistant Examiner.*